NORMAN F. BOUNSALL
INVENTOR.

BY Robert G. Clay

ATTORNEY

NORMAN F. BOUNSALL
INVENTOR.

BY Robert S. Clay

ATTORNEY

United States Patent Office 3,229,035

Patented Jan. 11, 1966

3,229,035

SELECTIVE RECORDING AND DISPLAY SYSTEMS FOR TELEVISION RECORDERS

Norman F. Bounsall, Palo Alto, Calif., assignor to Ampex Corporation, Redwood City, Calif., a corporation of California Filed Sept. 11, 1962, Ser. No. 222,913
13 Claims. (Cl. 178—6.6)

Figure 1A:
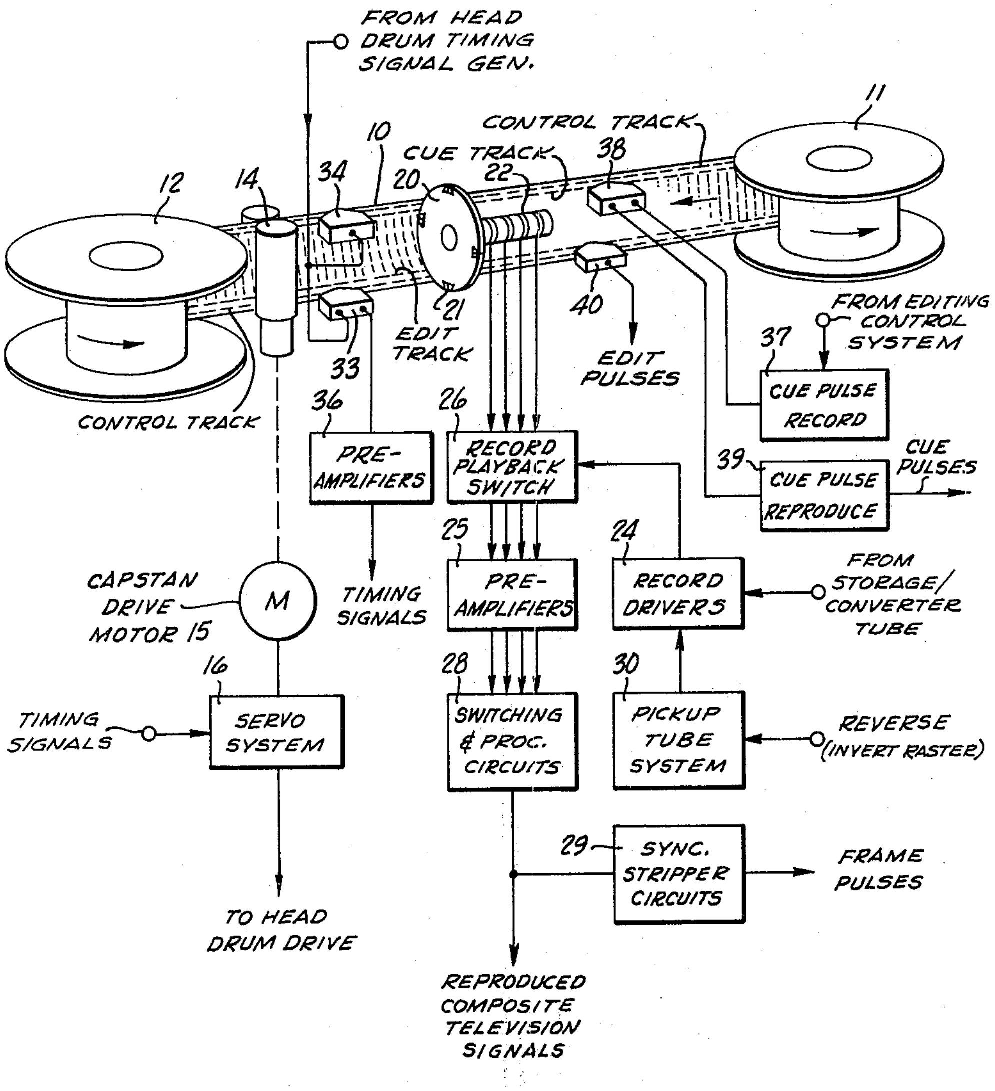

This invention relates to wideband recording and reproducing systems, and more particularly to systems for selectively recording and reproducing special material with a wideband magnetic tape recording and reproducing system.

Wideband magnetic recording and reproducing systems have found greatest use in the recording and playback of television program material. Such systems are not restricted to use with such material, but the context of preparation of television program material provides a particularly apt example of the advantages of the present invention, so that the invention will largely be described in this context.

It is now possible, by the use of electronic editing equipment, such as equipment constructed in accordance with the inventions described in previously filed patent applications, Serial Nos. 142,328 now U.S. Patent No. 3,180,930 and 142,332 now U.S. Patent No. 3,084,215 and assigned to the assignee of the present application, to assemble, revise, edit and supplement material recorded by a wideband magnetic tape recording and reproducing system. Previously these functions either could not be provided or had to be accomplished by laborious, time consuming and inaccurate mechanical splicing techniques. Systems in accordance with the above-identified inventions, however, now make it feasible to automatically locate desired transition points in or at the end of recorded program material and to substitute or add material from a new source to the previously recorded material. The use of such electronic editing and control systems eliminates the need for mechanical handling and splicing of tape, and particularly eliminates many problems and high wastage involved in locating and making precise splices.

The control systems for editing purposes that are described in the mentioned patent applications are shown employed with a transverse track magnetic recording and reproducing system of the type most widely used for storing and playing back television program material. While such control systems have greatly increased the versatility of magnetic tape television recorders, and have permitted great changes in the manner of producing television programs, it is now apparent that additional operative features are also desirable. It would be useful, for example, to be able to provide a "stop motion" effect. Such effects are commonly obtained in the motion picture industry by the repetitive printing of a single selected film frame. Such a capability in a television tape recorder would have even greater potential. For example, an athletic event and any other high speed sequence of events, such as the motions of a complex mechanical mechanism, could be "stopped" and the motions or events analyzed. A particularly promising use is in the generation of special effects for the preparation of commercials and other program material.

The principal technique for "stopping" motion uses repetitive recording of the same frame in order to present the stop motion illusion during subsequent playback. Equipment making such effects feasible should also have other capabilities, however. One such capability derives from the need in studio practice to review or monitor effects before the final recording is made. Another results from the need for some manner of terminating the stop motion automatically, after a desired time interval or number of frames. Still another capability would be useful, in that it is often desirable to "stop" action during live recording, so that the initial recording contains the desired effect.

A closely related technique which is often required in preparing program material is that of supplying "reverse motion." Whereas this may be accomplished by running or printing motion picture film in reverse, no suitable equivalent means has heretofore been available with wideband magnetic tape systems, which record a raster of lines within a frame.

It is therefore an object of the present invention to provide "stop motion" capabilities in a wideband magnetic tape recording and reproducing system.

Another object of the present invention is to provide an improved editing and control system for television program recorders.

Yet another object of the present invention is to provide "reverse motion" action with a wideband magnetic tape recording and reproducing system.

A further object of the present invention is to provide an improved control system for selectively adding or displaying a single frame of selected recorded data with a magnetic tape recording and reproducing system.

These and other objects of the invention are realized by a control system for a wideband recording and reproducing system which selectively combines the operations of an electronic storage means with a wideband recording and reproducing system. In a specific example of a system in accordance with the invention, television program material recorded on a wideband recording and reproducing system is supplemented by cue pulses which denote specific frames at which a stop motion effect is desired. The cue pulses are utilized during playback to control signal gating means which couple the signals representing the selected frame to a single frame storage means, such as a cathode ray storage and converter tube. Means are also provided to repetitively reproduce, for a selected time interval, the same frame from the storage tube. By repeatedly recording the same frame as it is reproduced from the storage tube, the desired stop motion effect is obtained on playback.

The same equipment also permits viewing of a selected frame of television program material. Thus a program editor may monitor a stop motion effect before it is recorded, or studio engineers may analyze transient effects.

Systems in accordance with the invention also permit action to be reversed as well as simply stopped. For such effects, a transverse track recording system is operated with the tape reels reveresd and the tape upside down, and the scanning raster of the associated pickup or converter tube is also inverted. The recorder system is provided with one or more extra heads for recording and sensing control and timing pulses with the tape in the inverted position. In accordance with this aspect of the invention, new action may be recorded without modification of the system, but will appear as reverse action when the tape is played back in the normal position.

Figures 1B, 2:
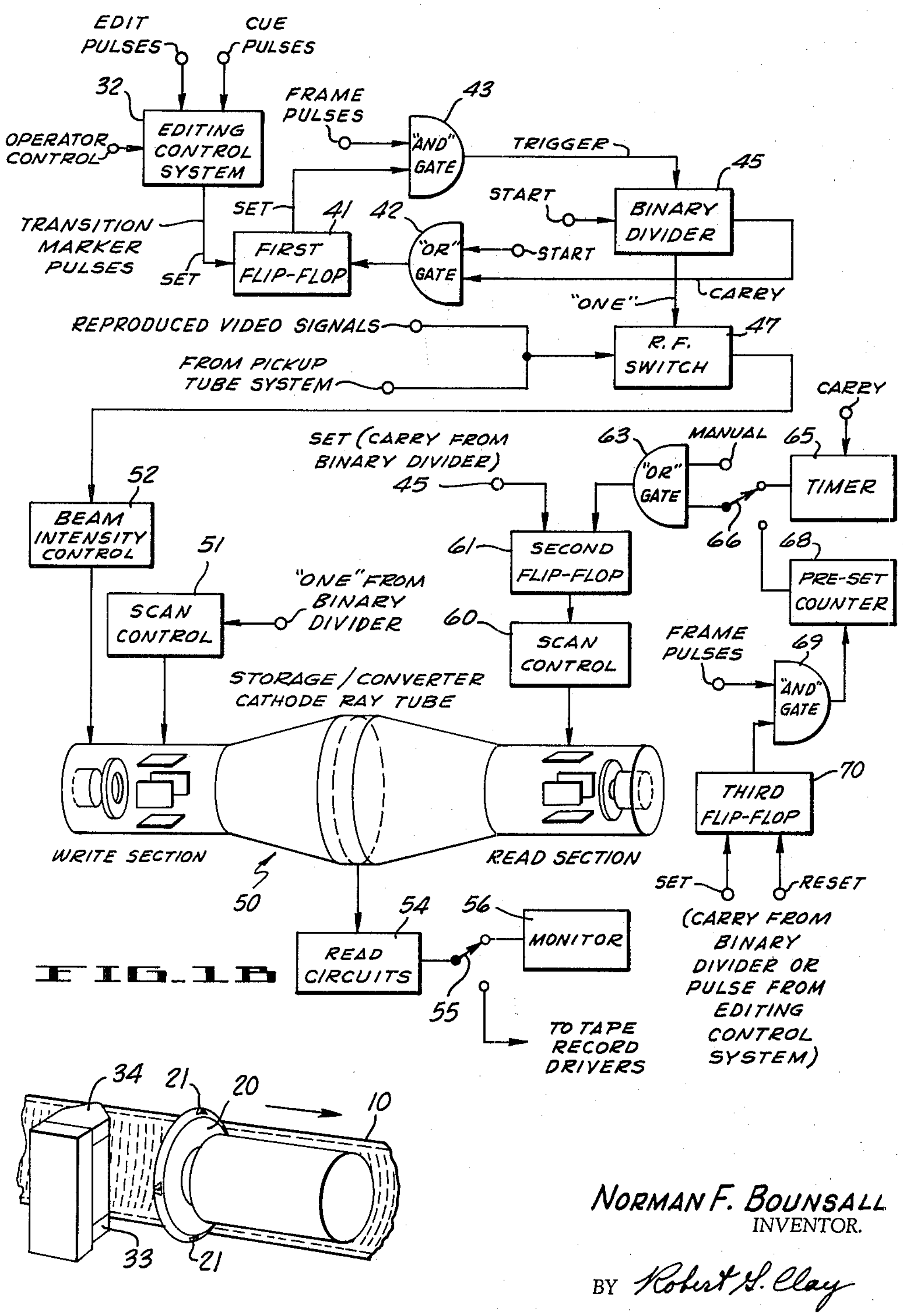

A better understanding of the invention may be had by reference to the following description, taken in conjunction with the accompanying drawings, in which:

FIGURE 1 is a block diagram and partial perspective representation of a stop motion and reverse action system in accordance with the present invention, and FIGURE 2 is an enlarged idealized representation of a part of the recording and reproducing system, showing the addition of a magnetic head for recording control signals during the reverse action mode.

The principal elements of a wideband recording and reproducing system suitable for storing television program material are shown in FIGURE 1. While other systems are known for this purpose, the transverse track magnetic tape system utilizing a rotating head drum which is therein depicted is particularly advantageous and most widely used. In this system, a relatively wide magnetic tape 10 moves between a supply reel 11 and a takeup reel 12 during normal recording and reproducing operation. The hubs for the reels 11, 12, and the inner apertures of the reels are so arranged that the reels 11, 12 may be interchanged and inverted. In this position, the recording surface of the magnetic tape 10 faces the magnetic heads, but the tape moves in reverse and upside down.

The drive motors and other means for controlling the path and longitudinal movement of the tape 10 have not been shown or have been illustrated only generally. Longitudinal movement of the tape 10 is provided by a capstan 14 which urges the tape 10 against an idler roller at a rate controlled by a capstan drive 15 receiving signals from a servo system 16. Only a part of the servo system has been indicated, for simplicity. One of the advantages of this type of recording and reproducing system is that different servo corrections act cumulatively to achieve precise time base stability in the reproduction of signals. The servo system 16 operates to control the speed of rotation of the magnetic heads from signals derived from a control track on the tape itself. As is well-known, a timing signal generator (not shown) coupled to a magnetic head drum 20 is used to record signals on a longitudinal control track which are representative of actual head drum speed variations during recording. This part of the servo system 16 drives the head drum 20 during reproduction in a time-varying fashion which insures that signals are reproduced as they were recorded. In addition, the servo system may control a female guide mechanism (not shown) disposed on the opposite side of the tape 10 from the head drum. The female guide mechanism holds the tape in precise cupped and contacting relation to the head drum despite head wear and other variations, including tape stretching. And further, as shown, the servo system 16 controls the capstan drive 15 so as to insure proper placement of the transverse tracks relative to the scanning heads during signal reproduction. An alternative form of servo system uses stable reference signals (studio sync) and compares these to reference signal components in the composite television signal itself in effecting control of the various driven elements. Either form of system is suitable here.

The head drum 20, shown in idealized form for simplicity, has four peripherally spaced magnetic heads 21 that are coupled together for recording, and that are separately coupled through appropriate rotary contacts 22 into individual signal channels for reproduction. In order to effect rapid changeover from the record to the reproduction mode, both the record drivers 24 and the reproduce preamplifiers 25 are coupled to the various heads 21 through a record plackback switch circuit 26. The circuit 26 is preferably electronically controlled or passively responsive so as to permit rapid transitions between the record and reproduce modes. The signals derived from the preamplifiers 25 are coupled to switching and processing circuits 28 which switch in synchronism with the rotation of the head drum 20 during the overlap intervals at the ends of the successive transverse tracks. Following switching, there is only a single continuous output signal representative of the recorded composite television signal. Sync stripper circuits 29 responsive to the composite signal extract frame pulses for use in the remainder of the control system.

Signals to be recorded are applied to the record drivers 24 through associated processing circuitry (not shown) and may be received from various input signal sources, including a pickup tube system 30. Alternatively, of course, the recorded signals may be derived from other recording and reproducing systems, from film playback and converter systems and from other studio sources. The pickup tube system 30 has conventional scanning control circuits for a normal raster and in addition has like scanning control circuits for providing an inverted raster. When the reverse action mode is selected, the principal scanning control is deactivated and the invert raster scanning system is utilized, so that a field is scanned from bottom to top instead of from top to bottom and from right to left instead of left to right. Input signals for the record drivers 24 are also received from a storage/converter tube described in greater detail below.

This inventive system may advantageously be employed as a part of an editing control system for a tape recorder, such as described in the above-identified previously filed patent applications. It is convenient to refer to one particular part of the overall system as an editing control system 32, although all elements assist in performing control of editing. The editing control system 32 generates program transition marker pulses that are synchronized to the television frames and identify program transition points, as selected by automatic means or by a program editor or director. The marker pulses are generated from edit pulses recorded on a longitudinal edit track on the tape 10 at spaced points (one per television frame), and from cue pulses recorded on a longitudinal cue track. These pulses may be superimposed as special signals on audio or control tracks that are shown separately for convenience.

In order to enable operation with both the normal record and reproduce mode and a reverse action mode, two longitudinal control tracks are employed, one adjacent to each edge of the tape 10. A different magnetic head is positioned adjacent to each of the control tracks, a first head 33 being used for normal and playback and the second head 34 being used for recording in the reverse action mode. During recording, both heads 33, 34 are operated, but during playback only the first head 33 is coupled through preamplifiers 36 to the servo system 16. Cue pulses are selectively recorded on the cue track by an automatically or manually energized cue pulse record circuit 37 coupled to the cue pulse record and reproduce head 38. Reproduced cue pulses are applied through conventional reproduce circuits 39 to the editing control system and to other points in the complete system, (some details of which are not shown). An edit pulse head 40 is associated with the longitudinal edit track, although this may actually be an audio track or part of the cue track, with edit pulses constituting selected high frequency bursts.

Although certain parts of the system described hereinafter have for clarity been shown separately, such elements may actually serve multiple purpses within an overall system. Thus frame counting or interval timing circuits described below are usually employed as well for various other editing, animating and assembling functions provided by the system.

The transition marker pulses from the editing control system are applied to circuits that select a single desired from for subsequent processing. A given transition marker pulse denotes the start of a desired television frame, and sets a first flip-flop 41 which was previously reset to a start condition by start pulses applied through an OR gate 42. Signals appearing on the "set" output terminal of the first flip-flop 41 condition an AND gate 43 to which reproduced edit pulses or frame pulses are also applied. The marker pulse sets the first flip-flop 41 in sufficient time for the frame pulse to fully activate the AND gate 43, although a short delay may be used to insure coincidence. Output signals from the AND gate 43 constitute trigger pulses for a binary divider 45 that is coupled to control an RF switch 47. The binary divider 45 is initially set in its "0" state by start pulses for the system. When input pulses are applied to the trigger input terminal, the binary divider 45 reverses state. The first frame pulse thereafter, denoting the start of the selected frame, activates the "1" output terminal of the binary divider 45, operating the RF switch 47 to pass the composite television signal. The composite signal, from whichever signal source is used, is thus gated into the storage circuitry only when the RF switch 47 passes signals.

The RF switch 47 is closed for precisely one frame, because the second frame pulse applied to the AND gate 43 after the first flip-flop 41 has been set triggers the binary divider 45 while it is active in the "1" state. The second triggering of the binary divider 45 returns it to the "0" state, but concurrently provides a carry pulse signal through the OR gate 42 which resets the first flip-flop 41. Thereafter, until a transition marker pulse is again received to set the first flip-flop 41, the RF switch 47 remains open, so that no signals pass. The carry signal and the "1" signal provided from the binary divider 45 are also used for various other system functions.

A storage/converter cathode ray tube 50 provides the single frame storage and reproducing system for the present example. It will be recognized by those skilled in the art that a number of different devices are available which will store and thereafter reproduce a single frame of picture information. The storage/converter tube 50 may be of the widely used type which has a single central target section, on opposite sides of which are located electron guns and focusing elements for separate write and read sections. Inasmuch as such tubes are conventional, the cathode emitters, beam focusers and beam scanning mechanisms have been illustrated only in very general detail. A storage/converter tube is particularly appropriate for the present application, because it permits substantially instantaneous readout following write-in, and because the recorded picture can be read repetitively and non-destructively.

In order to write only a single desired frame of picture information in the storage element of the tube 50, a scan control 51 is coupled to be turned on by the "1" signal from the binary divider 45. When turned on, the scan control 51 responds to the composite television signal in normal fashion to provide a scanning raster of the two fields that comprise the selected television frame. Concurrently, the reproduced composite television signal modulates the beam intensity control 52 for the write section.

The read section includes read circuits 54 that couple the target element in the storage/converter cathode ray tube 50 through a selector switch 55 to the monitor 56 for the system (through a contact marked "Preview") or back to the record driver amplifiers 24 (through a contact marked "Record"). The scan control 60 for the read section is operated so that reproduction of a recorded frame begins without loss of synchronization. Although it will usually be preferred to provide a stop motion effect immediately, this can also be initiated at some later time because the scan controls are separate. An alternate manual or cue input signal is indicated only generally.

The remainder of the system is so arranged that the selected frame is reproduced a desired number of times or for a selected time interval, or until terminated manually. The scan control circuits 60 are operated by a second flip-flop 61 which is set by the carry signal from the binary divider 45. When the second flip-flop 61 is set the scan control 60 operates the read section continuously under control of the synchronizing signals that are part of the composite signal. By this is meant that the scan controls 51 and 60 for the two halves of the storage/converter tube 50 are locked to the frame pulses, studio sync signal or controlled in any other desired manner. Similarly, both the write and the read section may scan continuously, but the circuits may blank off the beam except when the activating signals are present.

The scan control 60 is turned off to terminate reproduction by resetting the second flip-flop 61 through an OR gate 63 in one of three different ways. A manual signal provided on actuation of an appropriate switch by an operator may terminate operation directly. Although this is not shown, the switching may take place at the editing control system 32, to insure that reproduction terminates at the end of a frame. The remaining input terminal to the OR gate 63 is controlled by pulses received from a timer 65 through a coupling switch 66. The timer may be a precision device, settable at any desired time interval and actuable to start timing under control of carry signals from the binary divider 45. With the switch 66 in its alternate contact position, control signals may be derived from a preset counter 68 that counts the frame pulses as the frames are produced. The frame pulses are directed to an AND gate 69 which is conditioned by set output signals from a third flip-flop 70, provided in response to a carry signal from the binary divider 45. The third flip-flop 70 is initially reset to its starting status by the same start pulses which set other bistable devices within the system.

The complete system of FIGURE 1 provides versatility heretofore not considered feasible with television recording equipment, or with other wideband data systems for recording and reproducing other types of material. Three different modes of operation of the system may be identified for convenience. One mode permits a desired point in the recorded program material to be selected during playback for the incorporation of a stop motion effect. In a second mode of operation, a desired point may be selected during recording for the introduction of a stop motion effect. In a third mode of operation, material may be recorded so as to provide a reverse motion effect.

The mode which permits stop action to be introduced during the reproduction of program material will usually be most widely employed. Ordinarily, a program editor or director who has charge of the preparation of television program material will desire to view the recorded material, make a trial selection of the point at which he desires the stop motion effect to take place, and then observe the nature of the effect which he is about to introduce, without changing the original recording until such time as he is fully satisfied. The present system permits these things to be done, and in such fashion that no manual operations are required.

During use of the tape transport and reproducing system in normal playback operation, the program editor may operate the editing control system 32 and cue pulse record circuits 37 to enter a mark denoting a point in the program material at which he desires a stop motion effect to take place. He also sets the timer 65 or the preset counter 68 for the duration of stop motion effect which he desires, setting the switch 66 to its appropriate contact. In order to observe the effect of the choices he has made, he sets the switch 55 at the "Preview" position, so that the stop motion action appears on the monitor 56.

When the tape is replayed, the recorded cue pulse applied along with the edit pulses to the editing control system 32 generates the transition marker pulse so as to set the first flip-flop 41 at the start of the selected desired frame. Concurrently, an output signal provided with the first frame pulse through the AND gate 43 triggers the binary divider 45 into its "1" state, closing the RF switch 47. The scan control 51 of the write section of the storage/converter cathode ray tube 50 is turned on, and during scanning the video signal modulates the beam intensity at the control circuit 52. Thus the storage target in the storage/converter tube 50 receives and retains a single frame of television program material.

The end of the selected single frame marks the beginning, in this example, of the operation of the read section of the tube 50. The next frame pulse applied through the AND gate 43 triggers the binary divider 45, providing a carry signal and turning off the RF switch 47 by returning to the "0" state. Carry signals from the binary divider 45 set the second flip-flop 61 and permit the read section to scan repetitively for as many frames or as long a time as is desired. During the scan, the reproduced signals are applied to the monitor 56 and the stop motion effect may be observed. The stop motion effect is then terminated, manually by the program editor, or by the timer 65 or preset counter 68, as selected.

If the stop motion effect is not as desired, or at a desired point, the program editor may select a new transition point, or change the time at which the effect is to terminate. When he is satisfied with the material, as viewed on the monitor 56, he need only replay the tape once again, this time setting the switch 55 to the record position. When the stop motion point is reached, the reproduced frames from the storage/converter tube 50 are provided through the record drivers 24 and the record/playback switch 26 to the heads 21 on the head drum and the desired repeated recording of the same frame is achieved.

A like stop motion effect may be achieved directly during recording. When introducing stop motion to a live performance it is not feasible to repeat runs, so the switch 55 should be set directly to the record position. For this system also, the transition marker pulses are derived directly from operator control and not from the reproduced cue pulse track. The wideband signals which are applied to the RF switch 47 are those derived from the pickup tube system. The storage/converter tube 50 operates only in response to the control pulses, video signals, and frame pulses. It is therefore evident that the system operates in substantially the same way as previously described in conjunction with playback when introducing stop motion effects during live recordings. There is no ability to monitor, but the stop motion effect may be terminated by any of the three previously discussed means.

The reverse action mode requires a different positioning of the tape 10, and the use of the additional pulse head 34. For recording reverse action, the reels 11 and 12 are interchanged, although the oxide side of the tape 10 is still kept facing the head drum 20. The tape 10 is thus inverted, so that the track previously adjacent to the top edge of the tape 10 is now positioned adjacent to the bottom edge of the tape 10 as viewed in FIGURE 1. These positions may best be seen in the simplified view of FIGURE 2. The relatively slight angle of the transverse tracks relative to a true transverse line remains the same as previously. One more change is made in the system, this relating to the "reverse" signal which controls the pickup tube system. The scan controls for the vertical and horizontal axes are merely reversed. Thus the raster is scanned bottom line first so that the lines of each field are reversed, and the scanning along each line is from right to left.

As the tape is run through in the inverted and reversed position, control signals may be recorded in the usual fashion. At the completion of the reverse recording, the tape may be returned to its normal position on the reel hubs, and again played through. The head drum 20 and servo system 16 then operate normally to cause the heads 21 to scan along the proper angle across the moving tape 10 to reproduce signals from the transverse tracks. The scan along each horizontal television picture line and between successive horizontal line is in correct order, because of the previous use of the inverse raster, and because each transverse line on the tape contains an integral number of television lines. Each individual frame will therefore be played back in orderly fashion. Successive frames, however, are in inverse time order, to give the reverse motion effect. Moreover, the control track previously recorded by the second head 34 is under the first head 33 during normal operation.

Note that the cue and edit tracks are still available for use during the reverse action mode. The record circuits should be interchanged between the heads 38, 40 with the system shown, if cue or edit pulses are to be used. It is usually difficult to make an orderly transition between normally recorded material and reverse motion material. When the cue and edit tracks are used, however, transition points can be located readily by skilled operators.

What is claimed is:

1. A system for inserting simulated stop motion effects in magnetic recordings of television program material recorded on a magnetic tape system, comprising:

storage and converter means for storing and playing back signals representing a single television frame;

means responsive to signals recorded with the program material for identifying a selected transition point to identify an individual television frame;

means for coupling signals representing the selected individual television frame to the storage and converter means; and means responsive to the selected transition point for controlling the storage and converter means to provide signals representing the single television frame to the magnetic tape system.

2. The invention as set forth in claim 1 above, including additional means responsive to the selected transition point for terminating the reproduction of signals from the storage and converter means after a selected time interval.

3. A system for providing simulated stop motion effects in a television tape recorder comprising:

first control means responsive to signals reproduced by the tape recorder for identifying individual reproduced television frames;

single frame storage and playback means;

second control means coupled to the tape recorder for selecting a desired individual frame for the stop motion effect;

switch means coupling the television tape recorder to the single frame record and playback means; and means responsive to the first and second control means and controlling the switch means for selectively storing the desired individual frame and for repetitively reproducing the desired individual frame.

4. A system for inserting simulated stop motion effects in magnetic recordings of television program material recorded on a magnetic tape system, comprising:

means for storing and playing back signals representing a single television frame;

means responsive to signals reproduced by the magnetic tape system for gating a selected individual television frame;

means coupling the gated reproduced television frame to the means for storing;

means responsive to the completion of the gated reproduced television frame for controlling the means for playing back to repetitively reproduce the single frame; and mean responsive to the reeptitively reproduced single frame for coupling the signals to the magnetic tape system.

5. A system for providing special effects in program material recorded in a television tape recording system, comprising:

means responsive to signals recorded with the program material for identifying individual reproduced television frames;

single frame storage and playback means;

means for selecting a desired individual frame for the special effect, the means providing a transition marker pulse;

switch means responsive to the transition marker pulse for coupling the television tape recorder to the single frame storage and playback means;

means coupled to the single frame storage and playback means for selectively coupling the playback signals to the television tape recorder at a later time in the program mtaerial; and means coupled to the single frame storage and playback means for selectively terminating the coupling of the signals to the television tape recorder.

6. A system for providing simulated stop motion effects in a television tape recorder comprising:
transition control means coupled to the tape recorder for selecting a desired individual television frame;
single frame record and playback means;
duration control means for selecting a desired time interval of stop motion effects; and
means responsive to the selection of an individual television frame and to the duration control means, and controlling the single frame record and playback means, for repetitively reproducing the desired television frame to the television tape recorder during the selected time interval.

7. A system for providing special effects with a transverse track television tape recorder comprising:
a transverse track television tape recorder having television signal record and reproduce means, and including edit control means providing edit pulses denoting individual reproduced frames and cue control means providing cue pulses denoting a selected individual frame;
cathode ray storage and converter means including actuable record and playback means;
switching control means responsive to the edit pulses and the cue pulses for selectively coupling reproduced television signals representative of the selected frame to the cathode ray storage and converter means, the switching control means providing signals to actuate the storage means; and
sequence control means responsive to the edit pulses and the cue pulses and controlling the playback means of the cathode ray storage and converter tube means for repetitively playing back the stored frame.

8. The invention as set forth in claim 7 above, wherein the television tape recorder is adapted to operate the tape reels reversed and the tape inverted.

9. A magnetic tape reproducing system for providing controlled action effects comprising:
a transverse track recorder for providing successive frames of picture information;
means for selecting a desired transition point between a given pair of successive frames of picture information;
means responsive to the selection means for storing at least one frame of picture information;
means for repetitively reproducing the stored frame of picture information; and
means responsive to the repetitive reproduction means for recording the reproduced picture information in successive frames following the previously recorded picture information.

10. A system for providing special motion effects in magnetic recordings of television program material provided by a magnetic tape system, comprising:
means responsive to signals recorded with the program material for identifying a selected transition point in the program material; and
means responsive to the identified selected transition point for repetitively providing the desired segment of program material to be recorded to the system.

11. A system for providing special motion effects in magnetic recordings of television program material provided by a magnetic tape system, comprising:
means responsive to signals recorded with the program material for identifying a selected transition point in the program material; and
means responsive to the identified selected transition point for providing a desired portion of program material in reverse order to the system.

12. A system for providing simulated reverse action effects in television program material provided by a television magnetic tape recorder system, including:
magnetic tape transport means;
magnetic head means disposed adjacent the path of the magnetic tape for scanning the magnetic tape;
means for inverting and reversing the magnetic tape within the magnetic tape transport means relative to the scanning means; and
means responsive to signals recorded with the program material to be recorded for providing signals in an inverted and reverse raster to the magnetic head means, such that upon reproduction in a normal direction of movement the simulated reverse action effect is provided.

13. A system for providing reverse action recording of television program material comprising a transverse track television tape recorder, the recorder including supply and takeup reels and a rotating magnetic head drum, the supply and takeup reels being interchangeable, with the recording surface of the tape in the interchanged position being inverted, and the tape including a longitudinal control track, the recorder including a control playback head positioned adjacent each edge of the tape for playing back signals from the longitudinal control track in both the standard and inverted positions, the system further including the combination of a television pickup tube, scanning control means coupled to control the television pickup tube to selectively provide both a standard raster and an inverted raster, the inverted raster being used with the tape reels interchanged and the tape recording surface inverted, and means for controlling the television pickup tube to employ the inverted raster when the reels are inverted.

References Cited by the Examiner

UNITED STATES PATENTS 3,025,344 3/1962 Bosustow ---------- 178—6.6

DAVID G. REDINBAUGH, *Primary Examiner.*

HOWARD BRITTON, *Assistant Examiner.*